United States Patent
Kozaki et al.

(10) Patent No.: US 9,139,039 B2
(45) Date of Patent: Sep. 22, 2015

(54) AUTOMOBILE WHEEL

(75) Inventors: Akiyoshi Kozaki, Aichi (JP); Yasushi Fukui, Aichi (JP)

(73) Assignee: CENTRAL MOTOR WHEEL CO., LTD., Aichi (JP)

( * ) Notice: Subject to any disclaimer, the term of this patent is extended or adjusted under 35 U.S.C. 154(b) by 776 days.

(21) Appl. No.: 13/401,926

(22) Filed: Feb. 22, 2012

(65) Prior Publication Data
US 2012/0274127 A1 Nov. 1, 2012

(30) Foreign Application Priority Data

Apr. 28, 2011 (JP) ................................. 2011-100347

(51) Int. Cl.
*B60B 3/04* (2006.01)
*B60B 3/00* (2006.01)

(52) U.S. Cl.
CPC ................ *B60B 3/005* (2013.01); *B60B 3/042* (2013.01)

(58) Field of Classification Search
CPC .......... B60B 3/04; B60B 3/041; B60B 3/042; B60B 3/044; B60B 21/02
USPC ................. 301/6.91, 95.101, 95.104, 95.107, 301/95.108, 95.11, 63.101, 63.103; 152/381.5, 381.6, 400
See application file for complete search history.

(56) References Cited

U.S. PATENT DOCUMENTS 6,332,653 B1 * 12/2001 Shimizu et al. .......... 301/63.101
6,935,024 B2 * 8/2005 Shimizu .................... 29/894.353

FOREIGN PATENT DOCUMENTS

JP 2002-187405 A 7/2002
JP 2004-284495 A 10/2004

* cited by examiner

*Primary Examiner* — S. Joseph Morano
*Assistant Examiner* — Jean Charleston
(74) *Attorney, Agent, or Firm* — McDermott Will & Emery LLP

(57) ABSTRACT

An automobile wheel includes first bottom portions provided inward in a radial direction of a front side bead seat portion and a back side bead seat portion between the front side bead seat portion and back side bead seat portion and second bottom portions provided inward in the radial direction of the first bottom portions. The first bottom portions and second bottom portions are alternately provided in a circumferential direction. This configuration increases difference in area between area of a cross section in the radial direction of a tire-internal space in sections where the first bottom portions are provided and area of a cross section in the radial direction in sections where the second bottom portions are provided and thus allows improvement in an effect of reducing cavity resonant noise.

5 Claims, 17 Drawing Sheets

Fig.6

|  | First embodiment | Second embodiment | Comparative example 1 | Comparative example 2 |
|---|---|---|---|---|
| Area change rate (%) | 7.5 | 4.7 | 0 | 2.2 |

AUTOMOBILE WHEEL

CROSS-REFERENCE TO PRIOR APPLICATION

Priority is claimed to Japanese Patent Application No. 2011-100347, filed on Apr. 28, 2011, which is hereby incorporated by reference in its entirety herein.

FIELD OF THE INVENTION

The present invention relates to an automobile wheel including a wheel rim to which a tire is attached and a wheel disc which is coupled to an axle.

BACKGROUND

Examples of automobile wheels include a two-piece wheel having a generally cylindrical wheel rim and a generally disc-shaped wheel disc fitted and welded together. The wheel rim that forms the two-piece automobile wheel in general has bead seat portions for supporting a bead of a tire and flange portions on its both front and back sides and groove-shaped well portions between the front side bead seat portion and back side bead seat portion. Further, a wheel rim is known that has a ledge portion for continuously connecting the back side bead seat portion and the well portions together. Here, the well portions facilitate attachment of the tire in which the bead of the tire is recessed into the well portions when the tire is attached.

Development of engine noise reduction technologies reduced engine noise in automobiles. On the other hand, road noise due to vibration input from the road has been becoming more perceivable while an automobile is running. A suggested cause is cavity resonant noise occurring in a tire-internal space which is tightly closed by the tire and the wheel rim. The cavity resonant noise is produced since vibration input from a road while an automobile is running causes a standing wave with a wavelength of the circumference of the tire-internal space and the standing wave causes air column resonance at particular frequencies (for example, 180 to 240 Hz).

To reduce the cavity resonant noise, an example of a configuration with a plurality of protrusions protruding outward in the radial direction provided on the ledge of the wheel rim in the circumferential direction is proposes in JP-A-2002-187405 ("JP '405"), for example. In such a configuration, the cross-sectional area in the radial direction of the tire-internal space is different between the sections where the protrusions are formed on the ledge portion and the sections where the protrusions are not formed; thus, the cross-sectional area changes in the circumferential direction. This allows the frequency of the standing wave produced in the tire-internal space to change, allows prevention of occurrence of air column resonance, and thus provides an effect of reducing cavity resonant noise.

Further, an example of a configuration with a plurality of protrusions protruding outward in the radial direction provided to portions in the axial direction (front-back direction) of the well portions in the circumferential direction is proposed in JP-A-2004-284495 ("JP '495"). Such a configuration, similarly to JP '405, provides the effect of reducing cavity resonant noise since the area of the longitudinal cross sectional of the tire-internal space changes in the circumferential direction.

SUMMARY

However, some automobile wheels with a relatively small rim diameter have a relatively narrow rim width. Accordingly, in such a configuration, the wheel rim might not include a ledge portion. It is difficult for the configuration which does not include the ledge portion to employ the above-described configuration of JP '405.

On the other hand, the conventional configuration of JP '495 requires formation of protrusions on the well portions in addition to their original function of facilitating tire attachment work. This configuration limits the shapes and dimensions (length in the front-back direction, protrusion height outward in the radial direction, and so forth) of the protrusions. Accordingly, this limits the area change rate of the cross-sectional area of the tire-internal space, thus resulting in an insufficient effect of reducing cavity resonant noise.

An object of the present invention is to solve the above-described problem and to propose an automobile wheel which realizes an excellent effect of reducing cavity resonant noise.

An aspect of the present invention provides an automobile wheel including: a wheel rim having a front side bead seat portion and a back side bead seat portion for supporting a bead of a tire; and a wheel disc which is coupled to an axle, in which the wheel rim includes: a plurality of first bottom portions positioned between the front side bead seat portion and the back side bead side portion and provided inward in a radial direction of the bead seat portions; and a plurality of second bottom portions positioned between the front side bead seat portion and the back side bead seat portion and provided inward in the radial direction of the first bottom portions, and the first bottom portions and the second bottom portions are alternately provided in a circumferential direction of the wheel rim.

Such a configuration includes the first bottom portions and second bottom portions whose positions are different in the radial direction. This provides difference in area between the area of a cross section in the radial direction in sections where the first bottom portions are provided and the area of a cross section in the radial direction in sections where the second bottom portions are provided in a tire-internal space defined by the wheel rim and the tire when the tire is attached. Further, since the first bottom portions and second bottom portions are alternately provided in a circumferential direction, the area of a cross section in the radial direction of the tire-internal space changes in the circumferential direction. Accordingly, the configuration of the examples of present invention allows reduction in cavity resonant noise occurring in the tire-internal space.

Further, since recesses and protrusions are alternately formed in the circumferential direction by the first bottom portions and second bottom portions, the bottom portions function as stiffening ribs because of the recesses and protrusions, thus allowing improvement in circumferential rigidity of the wheel rim.

Another aspect of the present invention proposes an automobile wheel, in which the wheel rim includes third bottom portions positioned between the front side bead seat portion and the back side bead seat portion an provided adjacently to the first bottom portions in a front-back direction, and the third bottom portions are positioned at a same position or inward in the radial direction with respect to the front side bead seat portion and the back side bead seat portion and are positioned outward in the radial direction with respect to the first bottom portions.

Such a configuration provides a yet larger area difference between the area of a cross section in the radial direction in sections where the first bottom portions and third bottom portions are provided and the area of a cross section in the radial direction in the sections where the second bottom portions are provided, in the tire-internal space. Accordingly, the configuration further improves the effect of the present invention of reducing cavity resonant noise.

Further, the third bottom portions can function as stiffening ribs, thus allowing a further improvement in the circumferential rigidity of the wheel rim.

Another aspect of the present invention proposes an automobile wheel, in which the wheel rim includes fourth bottom portions positioned between the front side bead seat portion and the back side bead seat portion and provided adjacently to the second bottom portions in the front-back direction, and the fourth bottom portions are positioned inward in the radial direction with respect to the first bottom portions and are positioned at a same position or outward in the radial direction with respect to the second bottom portions.

Such a configuration provides a yet larger area difference between the area of a cross section in the radial direction in the sections where the first bottom portions and third bottom portions are provided and the area of a cross section in the radial direction in sections where the second bottom portions and fourth bottom portions are provided, in the tire-internal space. This further improves the effect of reducing cavity resonant noise.

Another aspect of the present invention proposes an automobile wheel, in which the wheel rim includes the two second bottom portions, and the second bottom portions are provided in positions where the second bottom portions face each other in the circumferential direction of the wheel rim.

In such a configuration, the two second bottom portions are provided in the positions where they face each other in the circumferential direction, thus further improving the effect of reducing cavity resonant noise.

Another aspect of the present invention proposes an automobile wheel, in which the wheel disc includes a disc flange portion which is fitted in the wheel rim, and the disc flange portion is joined with the second bottom portions of the wheel rim.

Such a configuration is a two-piece type automobile wheel in which the disc flange portion of the wheel disc is fitted in the second bottom portions of the wheel rim and inner peripheral surfaces of the second bottom portions and an outer peripheral surface of the disc flange are fitted and joined together. Here, the plurality of second bottom portions are formed in the circumferential direction, thus allowing formation of a stably fitted state. Therefore, the joining between the wheel rim and the wheel disc can be retained in a good condition.

Another aspect of the present invention proposes an automobile wheel, in which the wheel disc includes a ring-shaped disc flange portion, and the disc flange portion is fitted in the second bottom portions of the wheel rim.

In such a configuration, arc-shaped spaces are formed between the first bottom portions and the disc flange portion between the second bottom portions adjacent to each other. The plurality of spaces are formed at regular intervals in the circumferential direction. The spaces allow improvement in an effect of cooling a brake while an automobile is running.

Another aspect of the present invention proposes an automobile wheel, in which the disc flange portion of the wheel disc includes: arc-shaped flange base portions which are fitted in the second bottom portions of the wheel rim; and flange protrusion portions protruding outward in the radial direction of the flange base portions and disposed between the second bottom portions adjacent to each other.

Such a configuration improves rigidity of the wheel disc since the flange protrusion portions function as stiffening ribs. Further, in a fabricating step of joining the wheel disc and the wheel rim together, the flange protrusion portions are disposed between the second bottom portions adjacent to each other, thereby allowing easy and accurate positioning between the wheel disc and the wheel rim.

In this configuration, the flange protrusion portions may be in shapes that are fitted inside the first bottom portion between the second bottom portions adjacent to each other or may be in shapes that they are loosely fitted. In the former case, when the flange protrusion portions are fitted inside the first bottom portions with no gaps, this further enhances effects of improving rigidity of the wheel disc and the wheel rim.

As described above, examples of the automobile wheel of the present invention includes the first bottom portions provided inward in the radial direction of the front side bead seat portion and back side bead seat portion between the bead seat portions, the second bottom portions inward in the radial direction of the first bottom portions, and the first bottom portions and the second bottom portions are alternately provided in the circumferential direction. This enables increase in difference in area between the area of a cross section in the radial direction of the tire-internal space in the sections where the first bottom portions are provided and the area of a cross section in the radial direction in the sections where the second bottom portions are provided.

This allows reduction in cavity resonant noise which occurs in the tire-internal space.

BRIEF DESCRIPTION OF THE DRAWINGS

FIG. 6 is a chart illustrating the area change rate between area Sa and area Sb of cross sections of a tire-internal space T in the first embodiment and the area change rate between area Sc and area Sd of cross sections of the tire-internal space T in a second embodiment.

DETAILED DESCRIPTION

Figure 1:
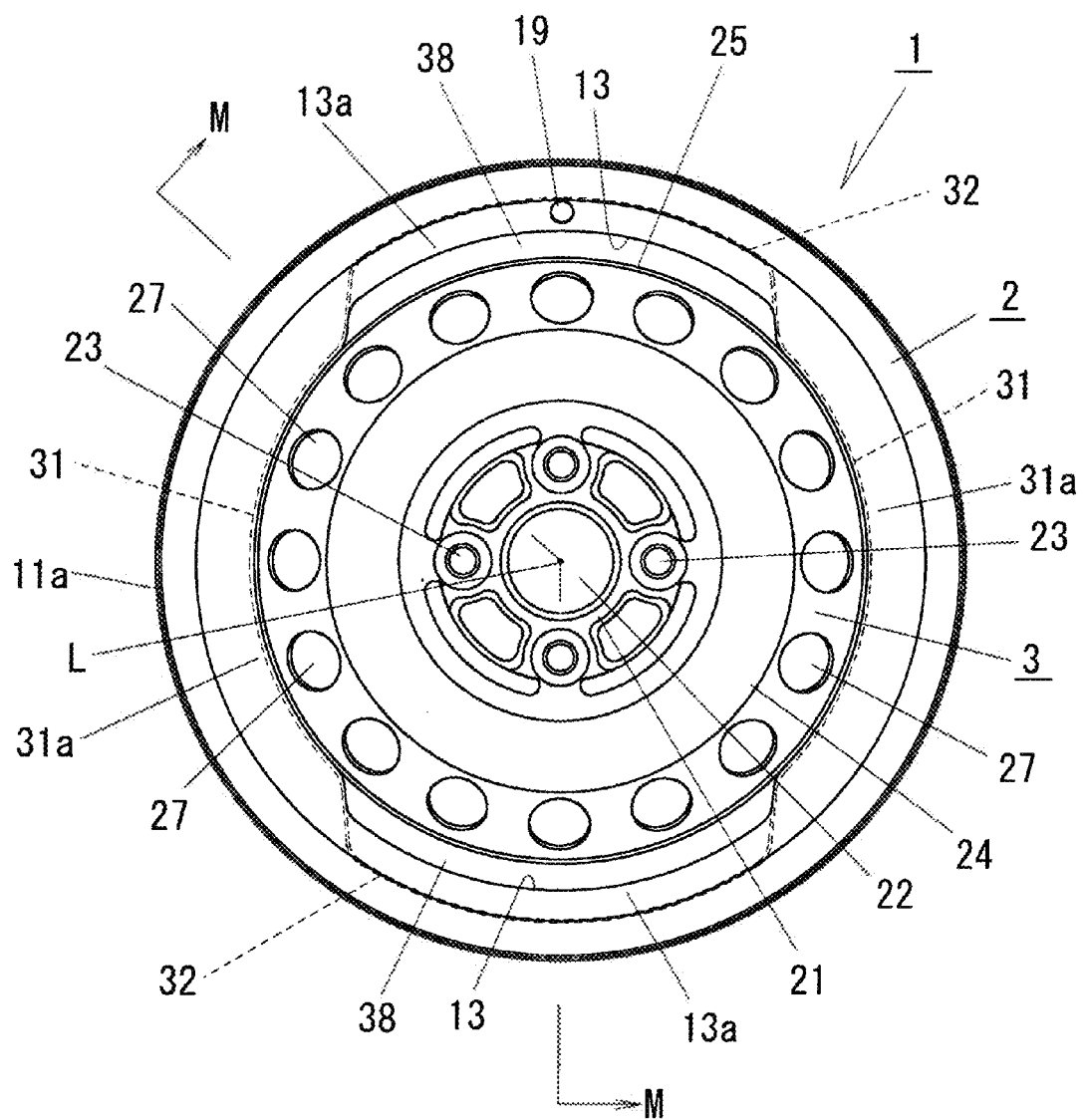
FIG. 1 is a plan view of an automobile wheel of a first embodiment, an example of which is in accordance with the present invention.

First to ninth embodiments of the present invention will be described in detail with reference to attached drawings.
First Embodiment As shown in FIGS. 1 to 4, an automobile wheel 1 of a first embodiment is configured such that wheel disc 3 is fitted in a wheel rim 2 and they are unitized by fillet welding. Each of the wheel rim 2 and the wheel disc 3 is molded from a steel plate. The automobile wheel 1 of the first embodiment is a two-piece steel wheel. The automobile wheel 1 is attached to an automobile by attaching a tire T to the wheel rim 2 and by coupling a hub mount portion 21 of the wheel disc 3 to an axle. Here, a tire-internal space P is defined by the wheel rim 2 and the tire T. The wheel rim 2 relates to an essential element of the present invention and will be described in detail later.

In the first embodiment, the direction from the back side of the wheel disc 3 toward the exterior side is referred to as the front direction, and its opposite direction is referred to as the back direction. Further, the direction toward the central axis line L of the automobile wheel 1 along the wheel radial direction which is orthogonal to the central axis line L is referred to as the inward direction, and its opposite direction is referred to as the outward direction.

The wheel disc 3 is formed into a generally disc shape and has a hub mount portion 21 with a hub hole 22 opening at its center and a ring-shaped hat portion 24 which projects in the face direction from an outer rim of the hub mount portion 21. The wheel disc 3 further has a disc flange portion 25 which extends in the back direction from the outer rim of the hat portion 24. Here, the hub mount portion 21 has a plurality of bolt holes 23 around the hub hole 22, which have nut seats and are formed by drilling at regular intervals on the same circumference. The hat portion 24 has a plurality of ornamental holes 27 formed by drilling at regular intervals on the same circumference. The hub mount portion 21, the hat portion 24, and the disc flange portion 25 are provided concentrically around the central axis line L of the wheel disc 3.

The wheel disc 3 is obtained by pressing a steel plate. Specifically, a generally square-shaped steel plate is formed into a saucer shape having a circular recess at its center. Subsequently, the shapes of the hub mount portion 21 and the hat portion 24 are formed by drawing, and the bolt holes 23 and the ornamental holes 27 are formed by drilling. Further, the disc flange portion 25 is formed by restriking process. The wheel disc 3 is molded through these processes. Since the wheel disc 3 can be molded in a similar manner to conventional steps, detailed descriptions will be omitted.

Figure 2:
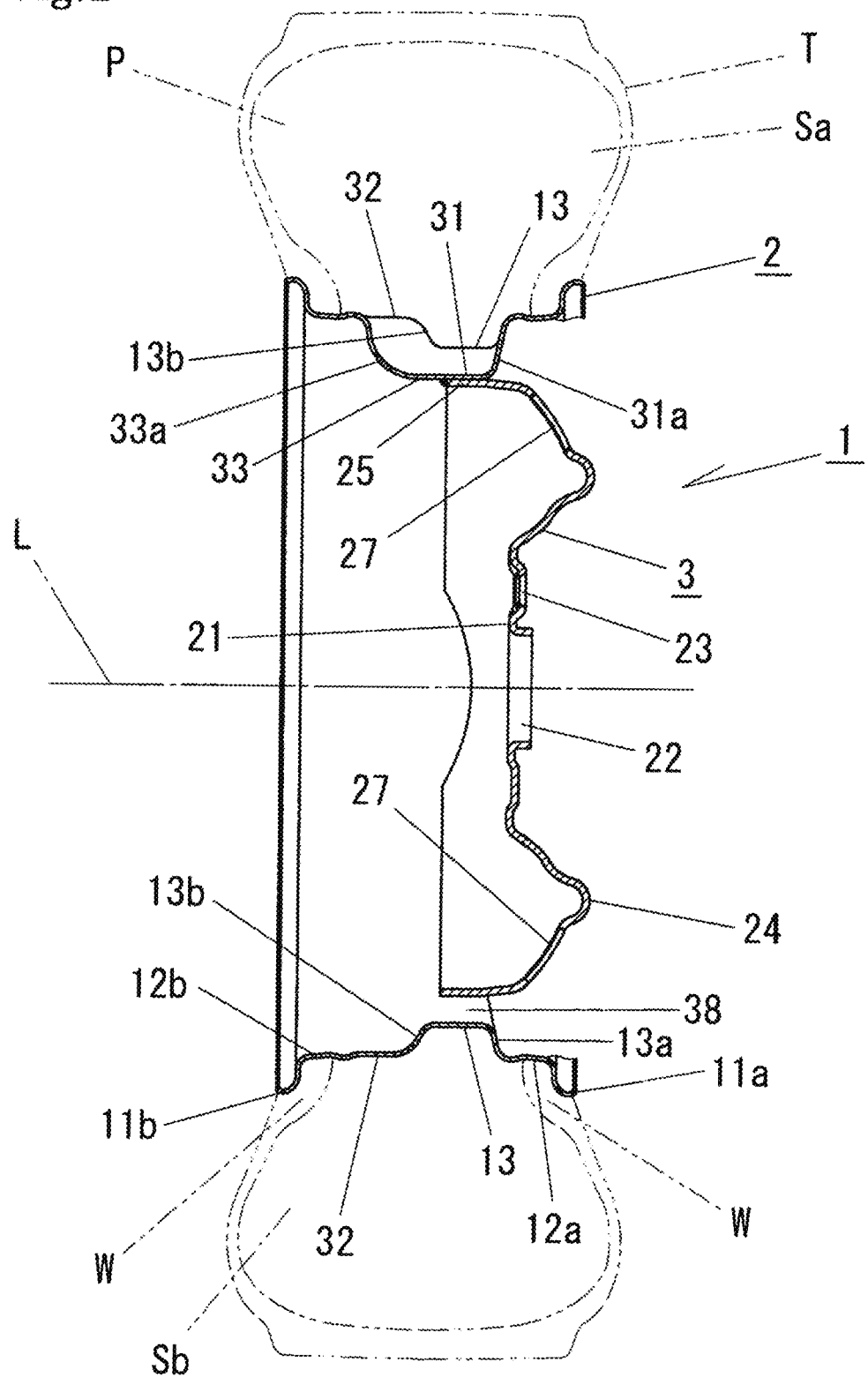
FIG. 2 is a cross-sectional view of FIG. 1 taken along line M-M.
Figure 3:
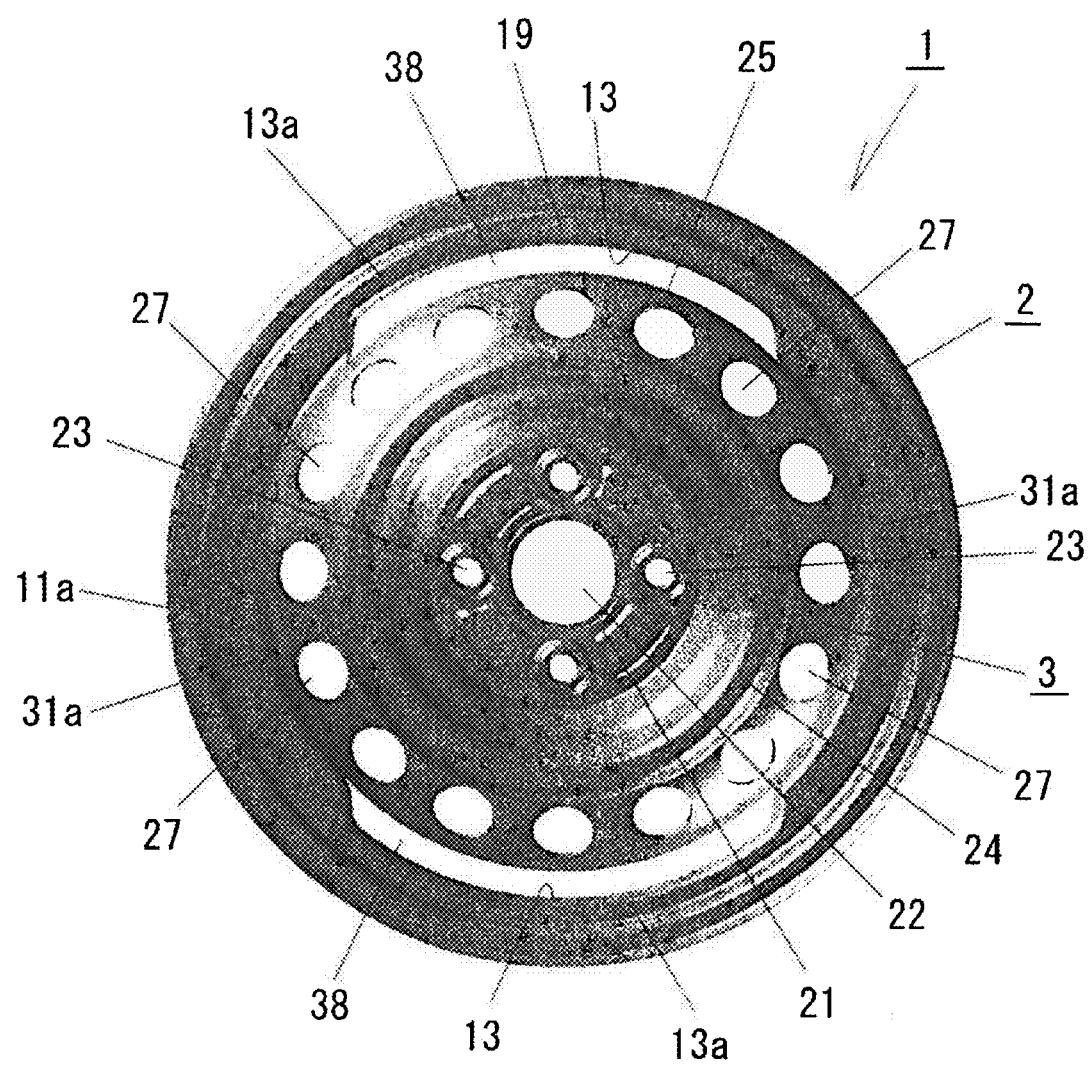
FIG. 3 is a plan view of an automobile wheel of the example.
Figure 4:
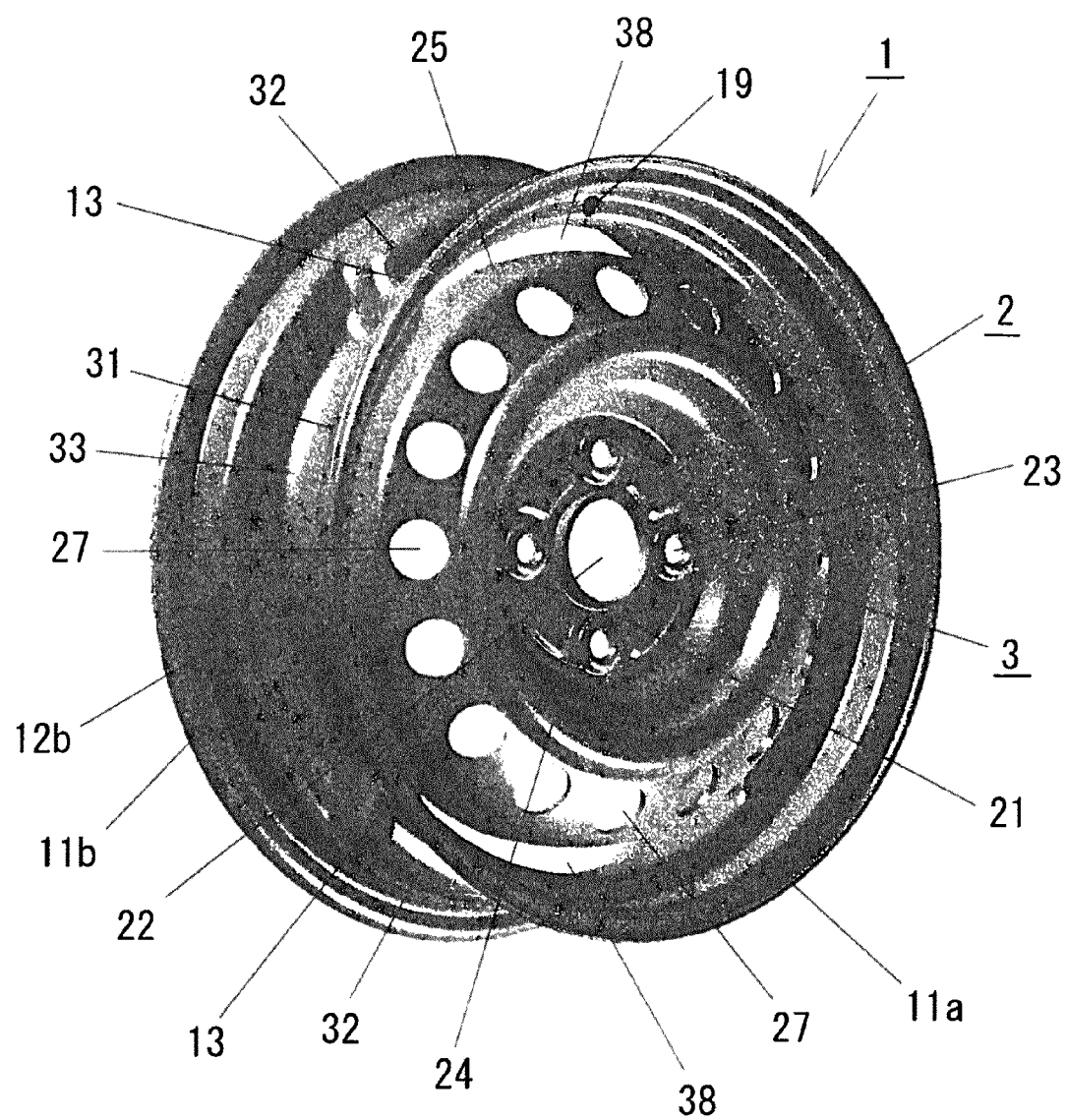
FIG. 4 is a perspective view of the automobile wheel of the example.

Next, an essential element of the present invention will be described.
As shown in FIGS. 2 and 4, the wheel rim 2 has a cylindrical shape with different cross sections. Rim flange portions 11a, 11b and bead seat portions 12a, 12b for supporting beads W, W of the tire T are provided on rims of openings on both the front and back sides. Between the front side bead seat portion 12a and back side bead seat portion 12b, two first bottom portions 13 positioned inward in the radial direction of the bead seat portions 12a, 12b and two second bottom portions 31 positioned inward in the radial direction of the first bottom portions 13 are provided alternately in the circumferential direction on the wheel rim 2. Further, the first bottom portions 13 and the second bottom portions 31 are concentrically formed. The first bottom portions 13 and the second bottom portions 31 provide a function of so-called well portions. In other words, the beads W of the tire T are recessed into the first bottom portions 13 and the second bottom portions 31 during attachment of the tire, thereby facilitating the attachment work.

As shown in FIG. 1, in the first embodiment, the two second bottom portions 31 are formed in positions where they face each other in the circumferential direction. Corresponding to them, the two first bottom portions 13 are formed in positions where they face each other in the circumferential direction. Further, the circumferential length of the second bottom portion 31 is set to approximately 25% (¼) of the whole circumference.

The circumferential length of the second bottom portion 31 is preferably 10% to 40% of the whole circumference. Further, it is preferable to provide two to five second bottom portions 31 on the basis of the set value of the circumferential length. The radial depth of the second bottom portion 31 is set such that the second bottom portion does not interfere with a brake disposed inside the wheel. In other words, reducing the size of the brake allows an increase in the radial depth of the second bottom portion 31. However, the radial depth needs to be set in consideration of brake performance. Specifically, the radial depth of the second bottom portion 31 is preferably set 1.1 times to 3 times larger than the radial depth of the first bottom portion 13 which functions as the well portion. Here, the radial depths of the first bottom portion 13 and the second bottom portion 31 are depths with respect to the bead seat portions 12a, 12b.

Further, the wheel rim 2 includes third bottom portions 32 provided on the back side to abut the first bottom portions 13. The third bottom portions 32 are formed to protrude outward in the radial direction of the first bottom portions 13 and to be positioned at the same height in the radial direction as the back side bead seat portion 12b. The wheel rim 2 also includes fourth bottom portions 33 provided on the back side to abut the second bottom portions 31. The fourth bottom portions 33 are formed to be positioned at the same height in the radial direction as the second bottom portions 31. In other words, the second bottom portions 31 and the fourth bottom portions 33 that are positioned at the same height in the radial direction are formed between the front side bead seat portion 12a and the back side bead seat portion 12b.

Figure 5:
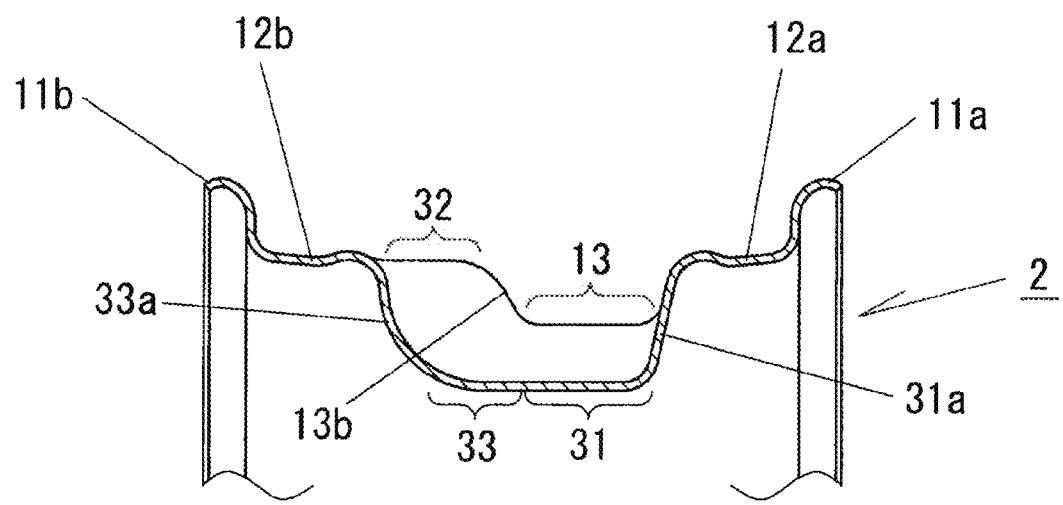
FIG. 5 is a cross-sectional view for explaining first to fourth bottom portions in a wheel rim.

Here, the positional relationship among the first bottom portion 13, second bottom portion 31, third bottom portion 32, and fourth bottom portion 33 of the wheel rim 2 of the first embodiment will be shown by FIG. 5.

As shown in FIG. 2, the first bottom portion 13 is continuously formed with the front side bead seat portion 12a via a wall portion 13a on the front side and continuously formed with the third bottom portion 32 via a wall portion 13b on the back side. The third bottom portion 32 is continuously formed with the back side bead seat portion 12b. The second bottom portion 31 has its back end continuously formed with a face end of the fourth bottom portion 33 and is continuously formed with the front side bead seat portion 12a via a wall portion 31a on the front side. Further, the fourth bottom portion 33 is continuously formed with the back side bead seat portion 12b via a wall portion 33a on the back side.

Such a wheel rim 2 can be obtained by molding a rectangular steel plate in prescribed dimensions. Specifically, a rectangular steel plate is bent such that its shorter sides butt each other, and the shorter sides are butt-jointed together by upset butt welding, thereby providing a cylindrical body (not shown). Subsequently, the cylindrical body undergoes a roll forming process in which it is squeezed from both inner and outer sides by a prescribed die, thereby molding the cylindrical body into a desired wheel rim shape. A valve hole 19 is then drilled in a prescribed portion in the circumferential direction. Known conventional methods can be used for molding the wheel rim 2 from a rectangular plate, and detailed descriptions will be omitted.

In the automobile wheel 1 of the above-described first embodiment, the wheel rim 2 includes the first bottom portions 13, second bottom portions 31, third bottom portions 32, and fourth bottom portions 33. Accordingly, in the tire-internal space P, difference in area becomes large between area Sa of a cross section in the radial direction in sections where the second bottom portions 31 and fourth bottom portions 33 are provided and area Sb of a cross section in the radial direction in sections where the first bottom portions 13 and third bottom portions 32 are provided. As described above, the second bottom portions 31 and fourth bottom portions 33 are formed over the whole length in the front-back direction between the front side bead seat portion 12a and the back side bead seat portion 12b. This enhances the effect of increasing the area difference.

Thus, the present embodiment has sections whose cross-sectional areas in the radial direction in the tire-internal space P are largely different, and therefore the frequency of a standing wave caused in the tire-internal space P while an automobile is running changes largely, thereby enabling reduction of cavity resonant noise.

The areas of the cross sections in the radial direction will be described with specific examples. Here, an example will be described where the wheel size is 15 inches and the tire size is 175/65. In the automobile wheel 1 of the first embodiment, the length in the front-back direction of the first bottom portion 13 is approximately 35 mm, the depth in the radial direction of the first bottom portion 13 is approximately 17 mm, the depths in the radial direction of the second bottom portion 31 and fourth bottom portion 33 are approximately 31 mm (each depth in the radial direction is a depth with respect to the bead seat portions 12a, 12b). Further, the third bottom portion 32 projects to almost the same height in the radial direction as the back side bead seat portion 12b, and the length in the front-back direction of the third bottom portion 32 is approximately 30 mm. With the automobile wheel 1 having the above dimensions, an area change rate (=(Sa−Sb)/Sb) is obtained between the area Sa of a cross section in the radial direction of the tire-internal space P in the sections where the second bottom portions 31 and fourth bottom portions 33 are provided and the area Sb of a cross section in the radial direction in the sections where the first bottom portions 13 and third bottom portions 32 are provided. When the area change rate increases, the area difference between the cross-sectional areas Sa and Sb increases, thus improving the effect of reducing cavity resonant noise. The aforementioned area change rate is shown in FIG. 6. As a comparative example 1, the area change rate of a configuration (not shown) which has the first bottom portions between the front side bead seat portion 12a and the back side bead seat portion 12b but does not have the second to fourth bottom portions is obtained in the same manner. In the comparative example 1, since the area of a cross section in the radial direction of the tire-internal space P is constant in the circumferential direction, the area change rate is 0%. On the other hand, as a comparative example 2, the area change rate of a conventional configuration (not shown) accordance with above-described JP '495 is obtained in the same manner. In other words, the comparative example 2 has a configuration (not shown) which includes a first bottom portion provided in the circumferential direction on a wheel rim and two third bottom portions provided in positions where they face each other in the circumferential direction. Here, the first bottom portion is formed in sections where no third bottom portion is provided and over the whole length in the front-back direction between the frontside bead seat portion and back side bead seat portion. In the configuration of the comparative example 2, the lengths of the third bottom portions in the front-back direction and the circumferential direction and the length of the first bottom portion in the front-back direction in the sections where the third bottom portions are formed are set to the same shape and dimensions as the first embodiment. In the comparative example 2, the area change rate between the section where the third bottom portions are provided and the section where no third bottom portion is provided is approximately 2.2%.

Those comparative examples 1 and 2 showed the above rates. On the other hand, in the first embodiment, the area change rate between the area Sa of a cross section in the sections where the second bottom portions 31 and fourth bottom portions 33 are provided and the area Sb of a cross section in the sections where the first bottom portions 13 and third bottom portions 32 are provided is approximately 7.5%. This indicates that the first embodiment allows very large increase in the area change rate compared to the comparative example 2 in the above-described conventional configuration. As such, the configuration of the first embodiment allows a large to area change rate because of the shape of the cross section of the wheel rim 2, thus improving the effectt of reducing cavity resonant noise compared to the conventional configuration (the configuration of JP '495).

Meanwhile, the wheel rim 2 can function as stiffening ribs because of shape effects caused by the first bottom portions 13, second bottom portions 31, third bottom portions 32, and fourth bottom portions 33, thus improving rigidity in the circumferential direction.

In the configuration of the first embodiment, the wheel disc 3 includes the ring-shaped disc flange portion 25 which is fitted in the second bottom portions 31 of the wheel rim 2. Further, the disc flange portion 25 is fitted in the second bottom portions 31, and both of them are welded together, thereby obtaining the automobile wheel 1 of the present invention, in which the wheel disc 3 and the wheel rim 2 are unitarily formed. Here, since the disc flange portion 25 has a ring shape, as shown in FIGS. 1 to 4, arc-shaped spaces 38, 38 are formed between the disc flange portion 25 and the first bottom portions 13 (and the third bottom portions 32). The spaces 38, 38 provide an effect of improving cooling of a brake while an automobile is running.

Second Embodiment

Figure 7:
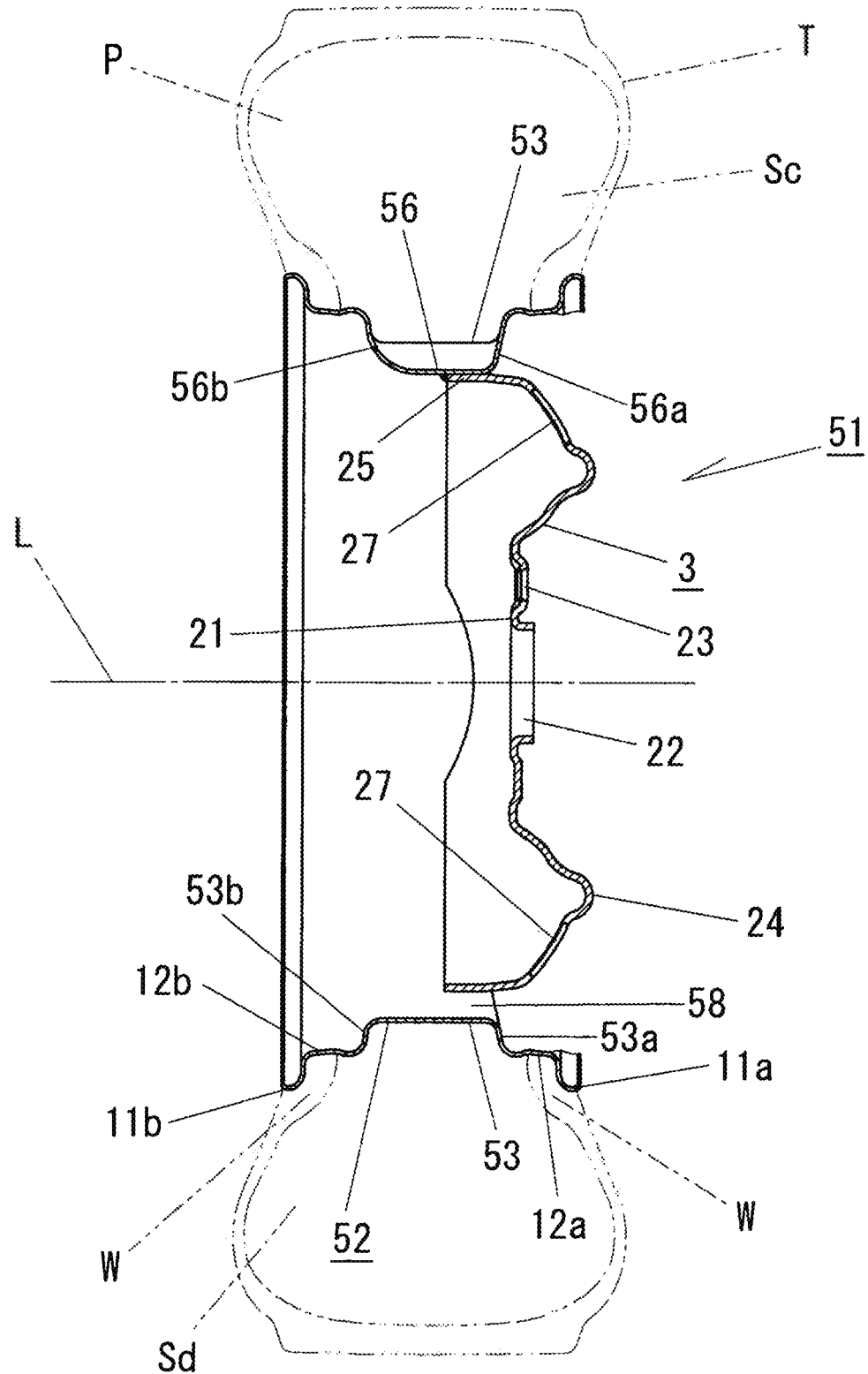
FIG. 7 is a cross-sectional view of an automobile wheel of the second embodiment, the example of which corresponds to FIG. 2.

As shown in FIG. 7, an automobile wheel 51 of a second embodiment has first bottom portions 53 and second bottom portions 56 provided alternately in the circumferential direction between a front side bead seat portion 12a and a back side bead seat portion 12b of a wheel rim 52. The two first bottom portions 53 are provided in positions where they face each other in the circumferential direction, and the two second bottom portions 56 are provided in positions where they face each other in the circumferential direction. The second embodiment has the same configuration as the first embodiment except for having no third bottom portions nor fourth bottom portions of the first embodiment. Like elements will be denoted by like reference numerals and symbols, and descriptions about those will be omitted.

In the second embodiment, each of the first bottom portions 53 and the second bottom portions 56 are formed over the whole length in the front-back direction between the front side bead seat portion 12a and the back side bead seat portion 12b. The first bottom portions 53 and the second bottom portions 56 are concentrically formed. The first bottom portions 53 are continuously formed with the front side bead seat portion 12a and back side bead seat portion 12b via wall portions 53a and 53b on the front and back sides. Similarly, the second bottom portions 56 are continuously formed with the front side bead seat portion 12a and the back side bead seat portion 12b via wall portions 56a and 56b on the front and back sides.

The configuration of the second embodiment provides a larger difference in area between area Sc of a cross section of the tire-internal space P in sections where the second bottom portions 56 are provided and area Sd of a cross section in sections where the first bottom portions 53 are provided. In the second embodiment, the first bottom portions 53 and second bottom portions 56 are formed over the whole length in the front-back direction between the front side bead seat portion 12a and the back side bead seat portion 12b, thus increasing the area difference. Accordingly, similarly to the above-described first embodiment, the effect of reducing cavity resonant noise which occurs while an automobile is running is improved.

With the configuration of the second embodiment, an area change rate (=(Sc−Sd)/Sd) is obtained between the area Sc of a cross section in the sections where the second bottom portions 56 are provided and the area Sd of a cross section in the sections where the first bottom portions 53 are provided in the same manner as the above-described first embodiment. Here, the length in the front-back direction of the first bottom portion 53 of the second embodiment is set to the sum of the lengths in the front-back direction of the first bottom portion 13 and third bottom portion 32 in the first embodiment. The depth in the radial direction of the first bottom portion 53 of the second embodiment is set to the same as the depth in the radial direction of the first bottom portion 13 of the first embodiment. The length in the front-back direction of the second bottom portion 56 of the second embodiment is set to the sum of the lengths in the front-back direction of the second bottom portion 31 and fourth bottom portion 33 in the first embodiment. The depth in the radial direction of the second bottom portion 56 of the second embodiment is set to the same as the depth in the radial direction of the second bottom portion 31 of the first embodiment. The area change rate is juxtaposed in FIG. 6. The area change rate of the second embodiment is approximately 4.7%, which is large compared to the comparative examples 1 and 2. Accordingly, the configuration of the second embodiment enables improvement in the effect of reducing cavity resonant noise compared to the conventional configuration (the configuration of '495).

Further, the wheel disc 3 has the same configuration as the first embodiment, thus providing spaces 58 between the first bottom portions 53 and the disc flange portion 25. The spaces 58, similarly to the first embodiment, provide an effect of cooling the brake.

Third Embodiment

Figure 8:
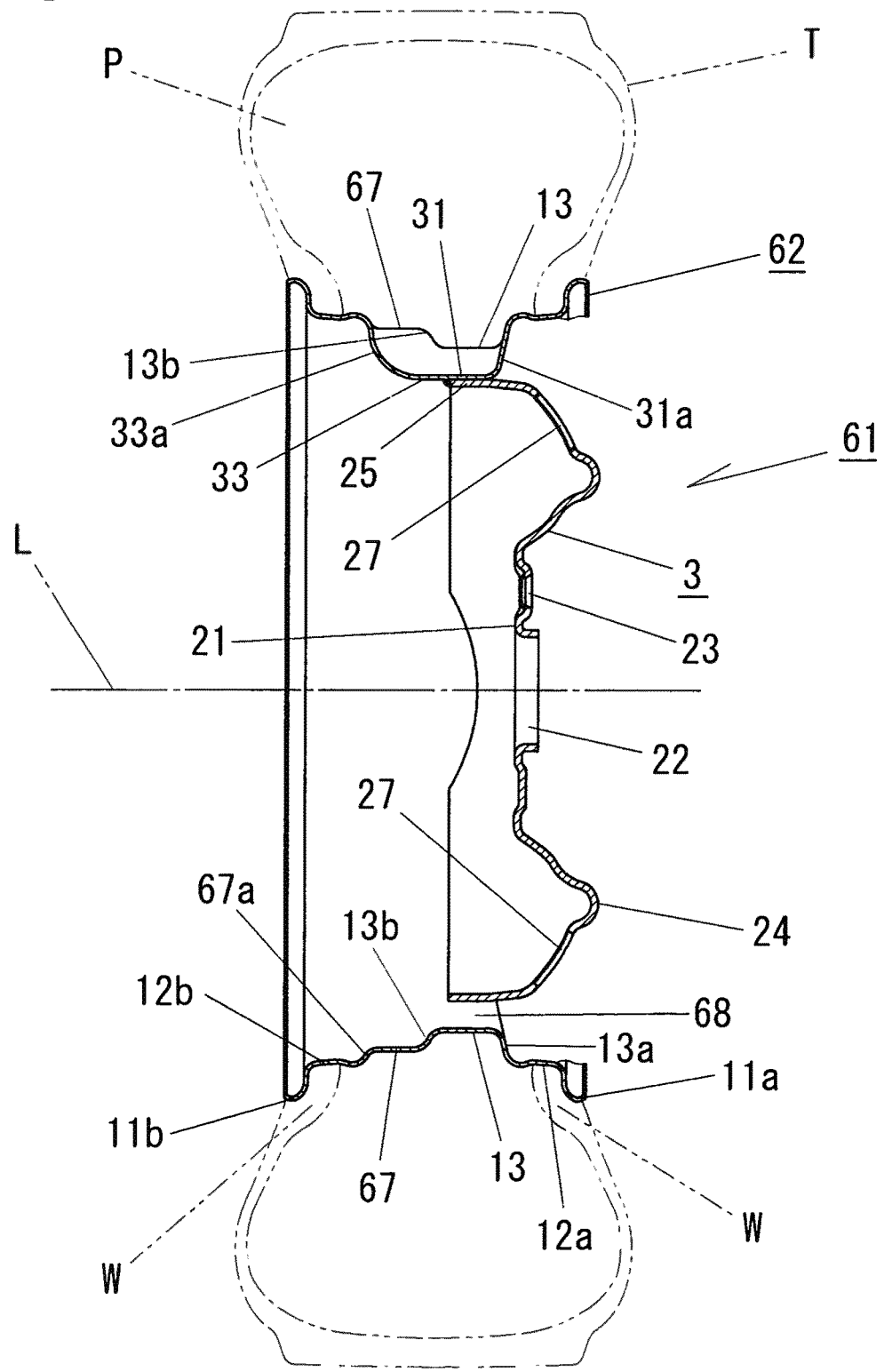
FIG. 8 is a cross-sectional view of an automobile wheel of a third embodiment, which corresponds to FIG. 2.

An automobile wheel 61 of a third embodiment is an alternative example of the above-described first embodiment, and, as shown in FIG. 8, has a configuration in which third bottom portions 67 of a wheel rim 62 are formed to be positioned inward in the radial direction of the back side bead seat portion 12b and positioned outward in the radial direction of the first bottom portions 13. Further, the third bottom portion 67 is continuously formed with the back side bead seat portion 12b via a wall portion 67a. The third embodiment has the same configuration as the first embodiment except for the third bottom portions 67, and descriptions about like configuration elements, reference numerals and symbols will be omitted.

The configuration of the third embodiment, similarly to the above-described first embodiment, has sections whose cross-sectional areas in the radial direction in the tire-internal space P are largely different, and therefore enables reduction of cavity resonant noise. This allows improvement in the effect of reducing cavity resonant noise compared to the above-described conventional configuration (the configuration of JP '495). Further, since the wheel disc 3 has the same configuration as the first embodiment, the automobile wheel 61 has spaces 68 formed between the first bottom portions 13, third bottom portions 67, and the disc flange portion 25. The spaces 68, similarly to the first embodiment, provide an effect of cooling the brake.

Fourth Embodiment

Figure 9:
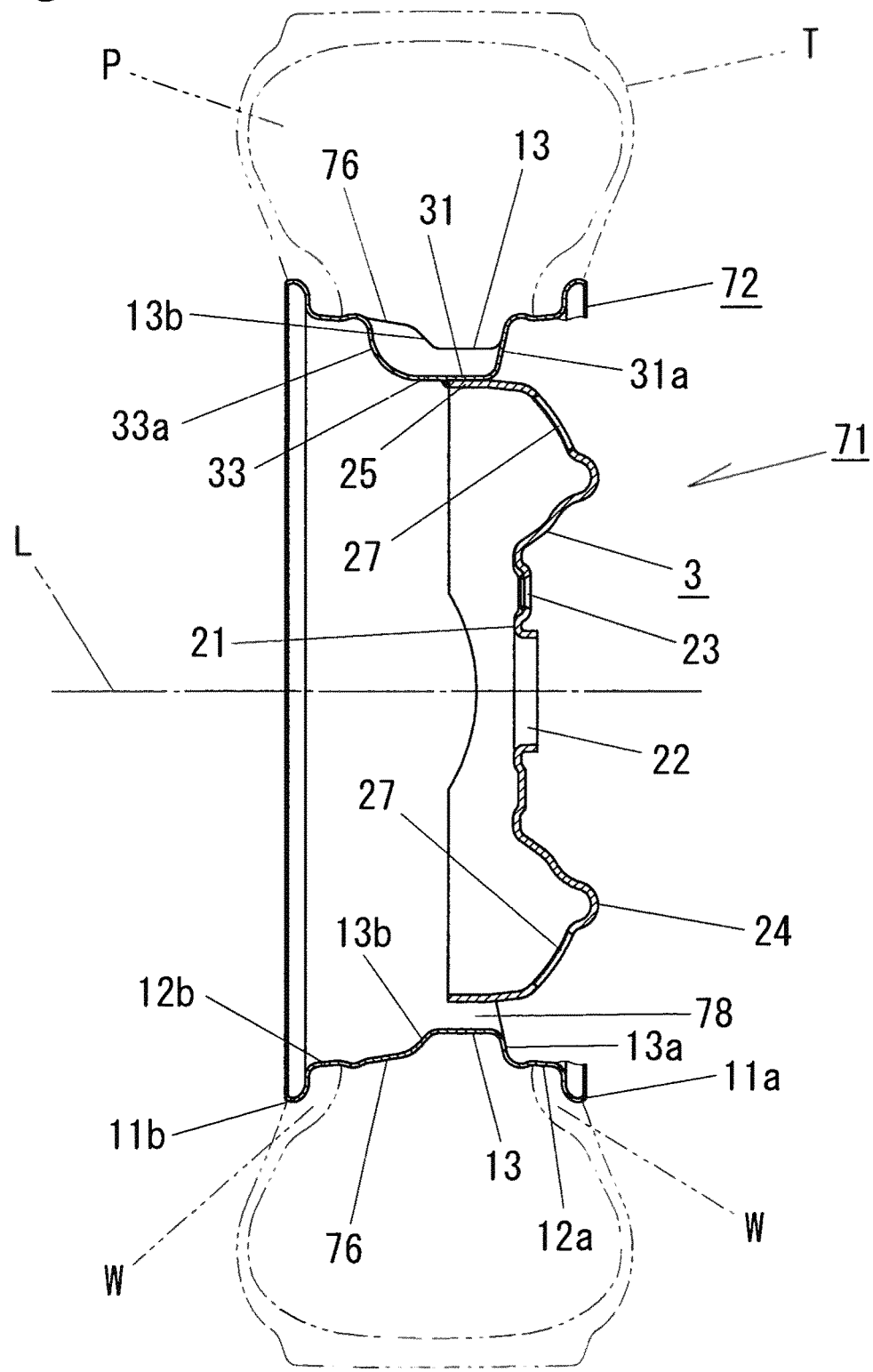
FIG. 9 is a cross-sectional view of an automobile wheel of a fourth embodiment, which corresponds to FIG. 2.

An automobile wheel 71 of a fourth embodiment is an alternative example of the above-described first embodiment, and, as shown in FIG. 9, has a configuration in which third bottom portions 76 of a wheel rim 72 have their back ends continuously formed with the back side bead seat portion 12b and are formed to incline inward in the radial direction toward the front side. Here, the third bottom portions 76 are positioned inward in the radial direction of the back side bead seat portion 12b and positioned outward in the radial direction of the first bottom portion 13. The fourth embodiment has the same configuration as the first embodiment except for the third bottom portions 76, and descriptions about like configuration elements, reference numerals and symbols will be omitted.

The configuration of the fourth embodiment, similarly to the above-described first embodiment, has sections whose cross-sectional areas in the radial direction in the tire-internal space P are largely different, and therefore enables reduction of cavity resonant noise. This allows improvement in the effect of reducing cavity resonant noise compared to the conventional configuration of above-described JP '495. Further, since the wheel disc 3 has the same configuration as the first embodiment, the automobile wheel 71 has spaces 78 formed between the first bottom portions 13, third bottom portions 76, and the disc flange portion 25. The spaces 78, similarly to the first embodiment, provide an effect of cooling the brake.

Fifth Embodiment

Figure 10:
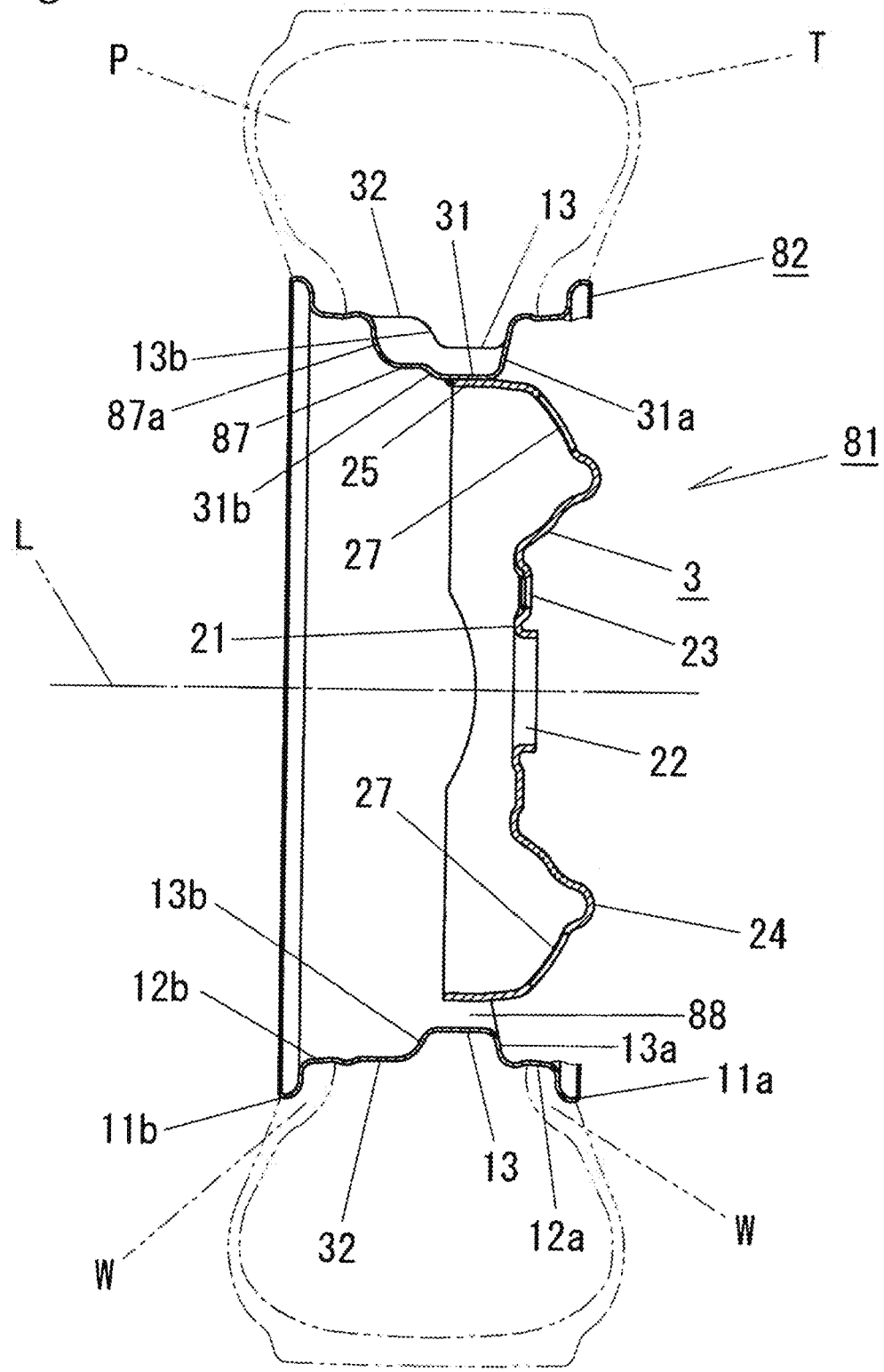
FIG. 10 is a cross-sectional view of an automobile wheel of a fifth embodiment, which corresponds to FIG. 2.

An automobile wheel 81 of a fifth embodiment is an alternative example of the above-described first embodiment, and, as shown in FIG. 10, has a configuration in which fourth bottom portions 87 of a wheel rim 82 are formed to be positioned outward in the radial direction of the second bottom portions 31 and positioned inward in the radial direction of the first bottom portions 13. The second bottom portions 31 are continuously formed with the fourth bottom portions 87 via a wall portion 31b. Further, the fourth bottom portions 87 are continuously formed with the back side bead seat portion 12b via a wall portion 87a. The fifth embodiment has the same configuration as the first embodiment except for the fourth bottom portions 87, and descriptions about like configuration elements, reference numerals and symbols will be omitted.

The configuration of the fifth embodiment, similarly to the above-described first embodiment, can improve the effect of reducing cavity resonant noise compared to the conventional configuration (the configuration of IP '495). The automobile wheel 81 has spaces 88 formed between the first bottom portions 13, third bottom portions 32, and the disc flange portion 25. The spaces 88, similarly to the first embodiment, provide an effect of cooling the brake.

Sixth Embodiment

Figure 11:
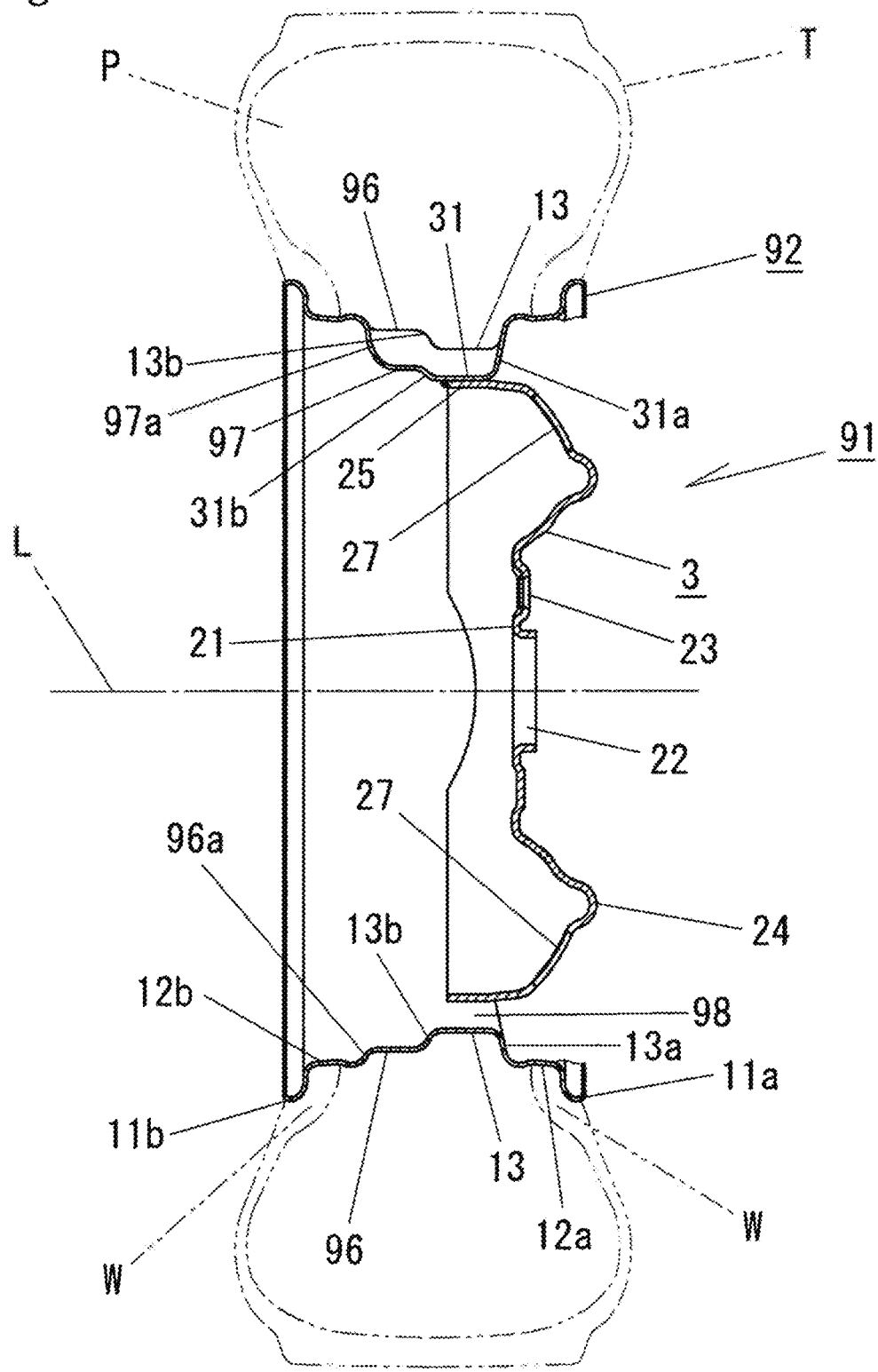
FIG. 11 is a cross-sectional view of an automobile wheel of a sixth embodiment, which corresponds to FIG. 2.
Figure 12:
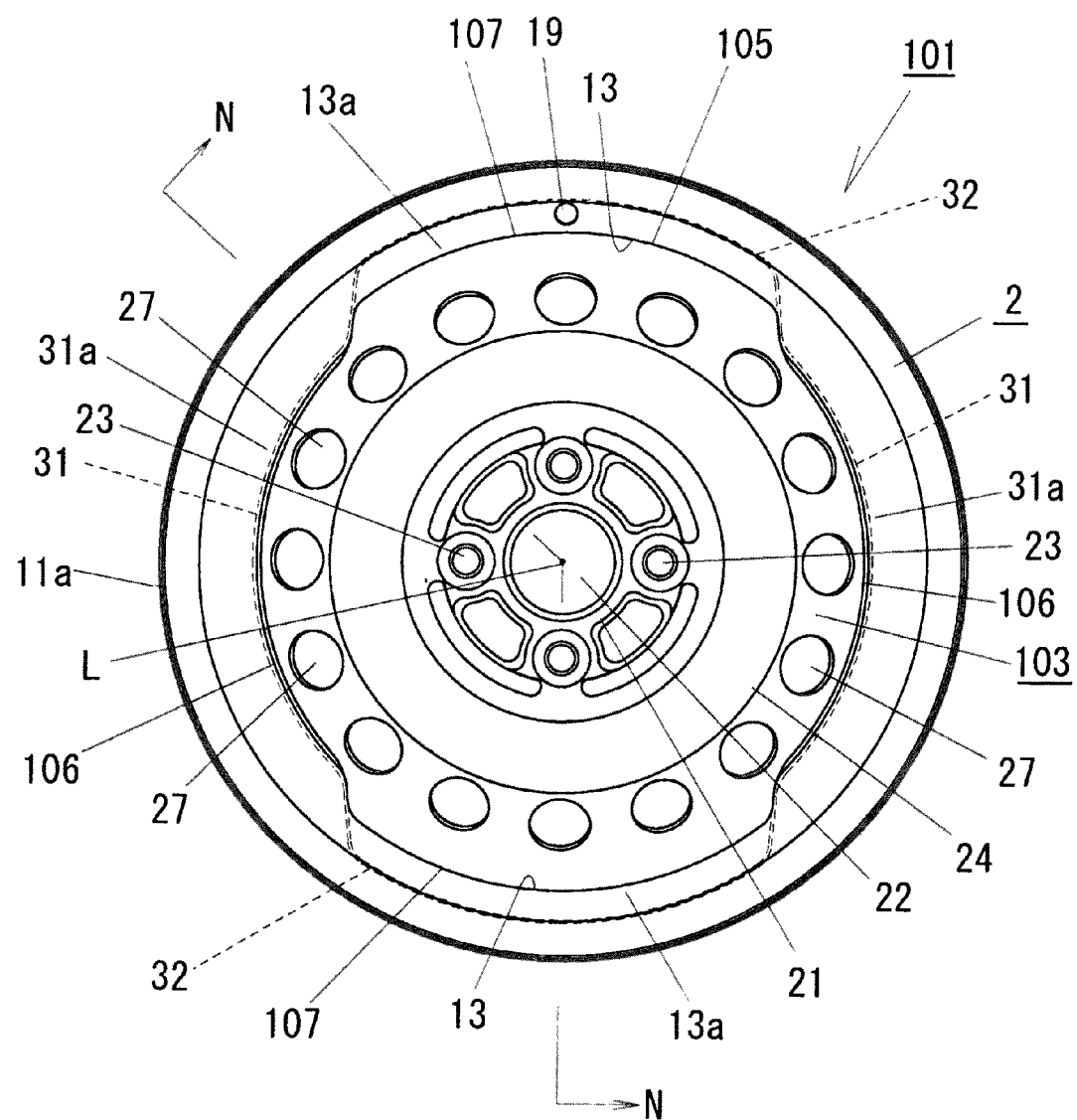
FIG. 12 is a plan view of an automobile wheel of a seventh embodiment.
Figure 13:
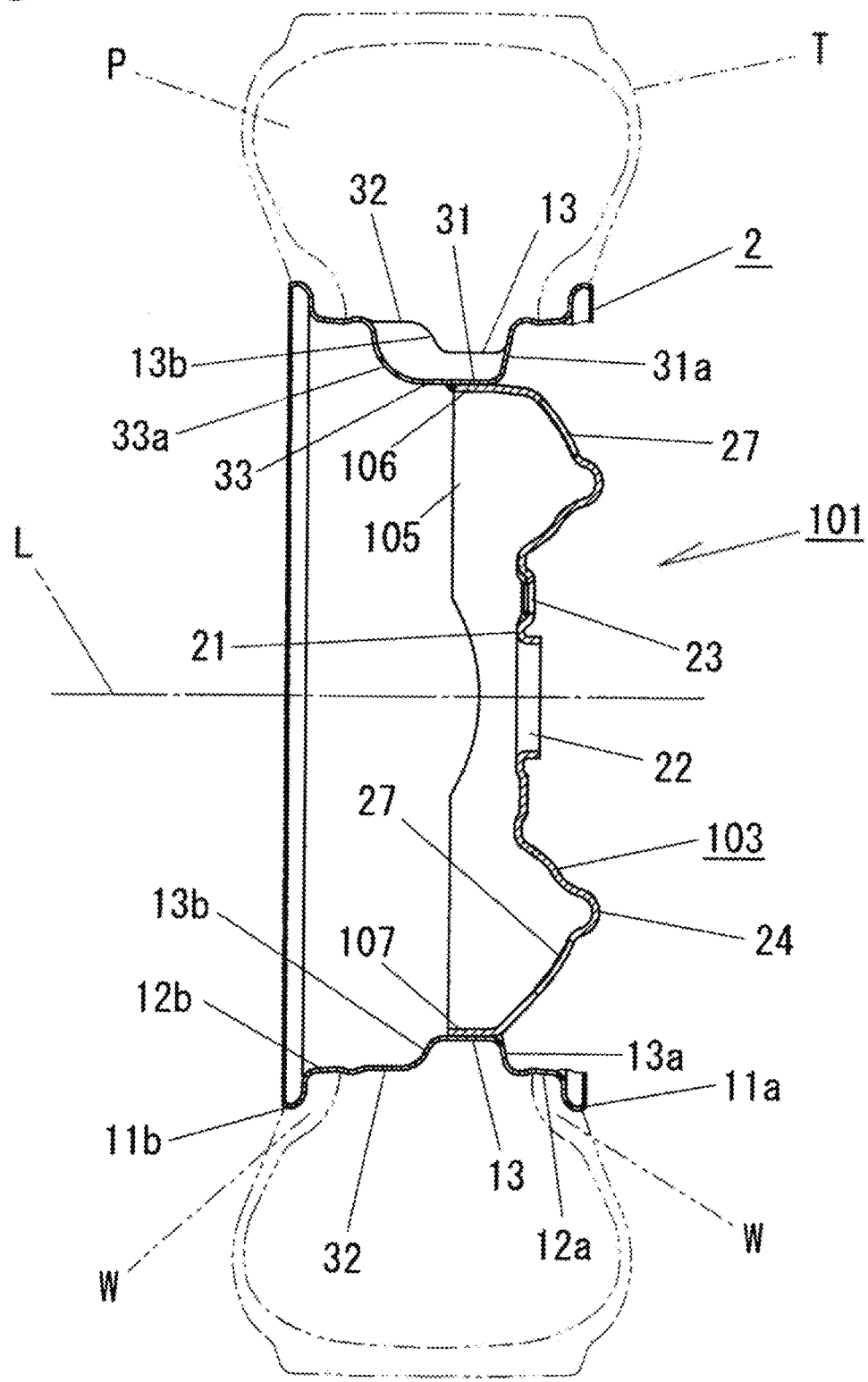
FIG. 13 is a cross-sectional view of FIG. 12 taken along line N-N.
Figure 14:
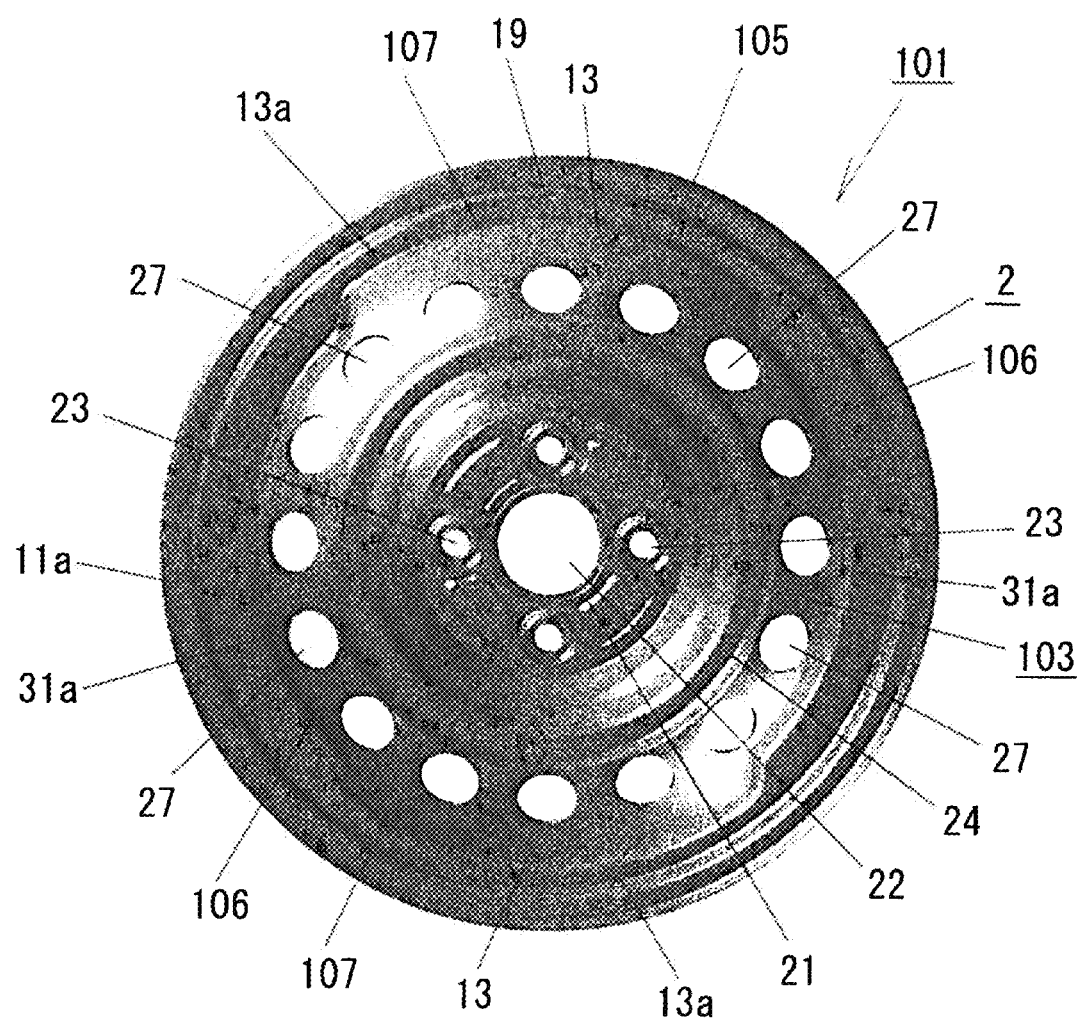
FIG. 14 is a plan view of the automobile wheel 101 of the seventh embodiment.
Figure 15:
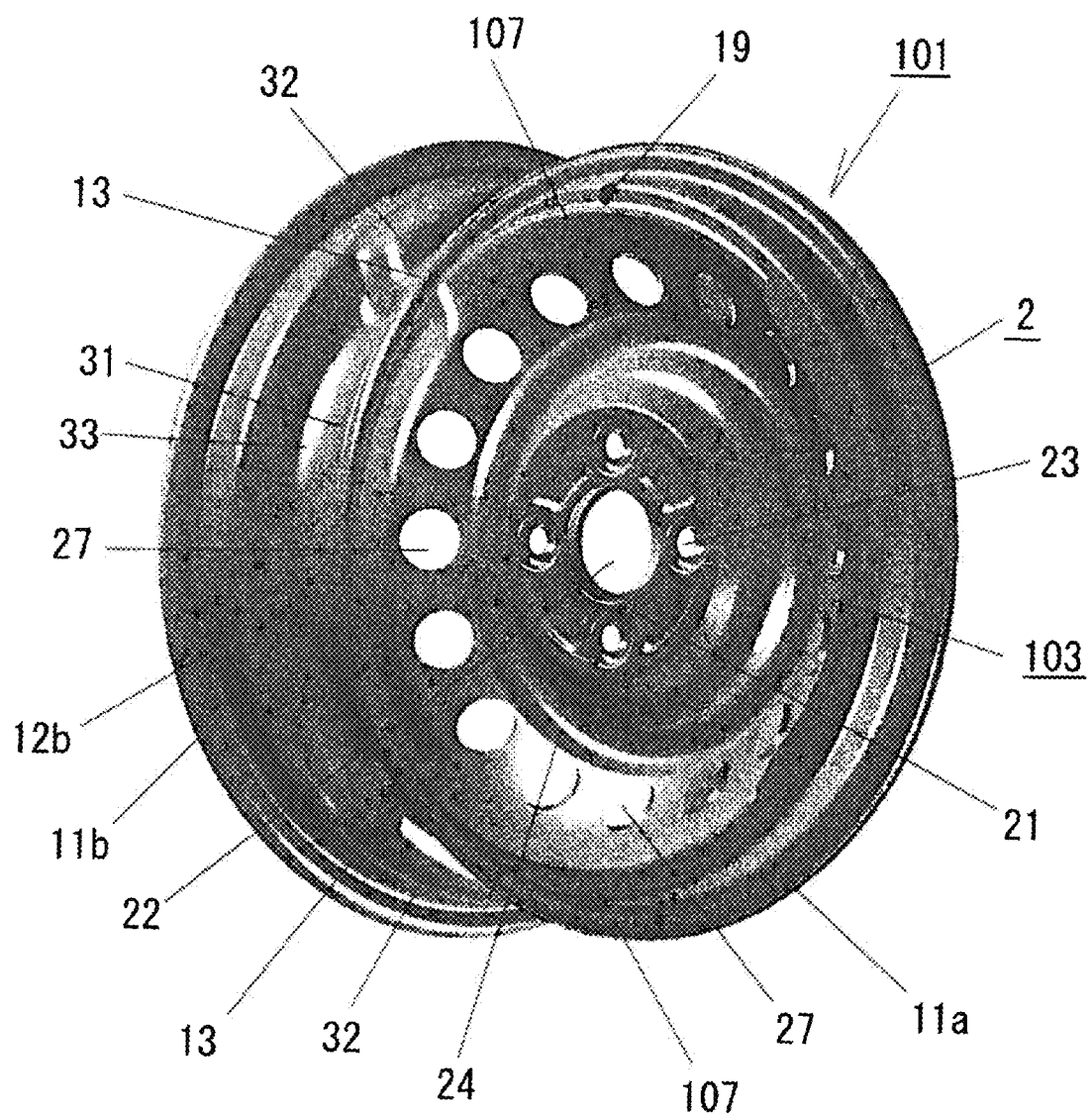
FIG. 15 is a perspective view of the automobile wheel 101 of the seventh embodiment.

An automobile wheel 91 of a sixth embodiment is an alternative example of the above-described first embodiment, and, as shown in FIG. 11, has a configuration in which third bottom portions 96 of a wheel rim 92 are positioned inward in the radial direction of the back side bead seat portion 12b and positioned outward in the radial direction of the first bottom portions 13 and in which fourth bottom portions 97 are positioned outward in the radial direction of the second bottom portions 31 and positioned inward in the radial direction of the first bottom portions 13. Further, the third bottom portions 96 are continuously formed with the bead seat to portion 12b via a wall portion 96a, and the second bottom portions 31 are continuously formed with the fourth bottom portions 97 via the wall portion 31b. The fourth bottom portions 97 are continuously formed with the back side bead seat portion 12b via a wall portion 97a. The sixth embodiment has the same configuration as the first embodiment except for the third bottom portions 96 and fourth bottom portions 97, and descriptions about like configuration elements, reference numerals and symbols will be omitted.

The configuration of the sixth embodiment, similarly to the above-described first embodiment, can improve the effect of reducing cavity resonant noise compared to the conventional configuration (the configuration of JP '495). The automobile wheel 91 has spaces 98 formed between the first bottom portions 13, third bottom portions 96, and the disc flange portion 25. The spaces 98, similarly to the first embodiment, provide an effect of cooling the brake.

Seventh Embodiment

As shown in FIGS. 12 to 15, an automobile wheel 101 of a seventh embodiment has a configuration in which a disc flange portion 105 of a wheel disc 103 includes flange protrusion portions 107 which fit inside the first bottom portions 13 of the wheel rim 2. The seventh embodiment has the same configuration as the first embodiment except for the disc flange portion 105 of the wheel disc 103, and descriptions about like configuration elements, reference numerals and symbols will be omitted.

The disc flange portion 105 of the wheel disc 103 includes arc-shaped flange base portions 106 which are fitted in the second bottom portions 31 of the wheel rim 2 and the flange protrusion portions 107 which are formed to protrude outward in the radial direction of the flange base portions 106 and disposed between the second bottom portions 31 adjacent to each other. Here, the dimensions and shapes of the flange protrusion portions 107 are set so that they are fitted inside the first bottom portions 13 between the second bottom portions 31 adjacent to each other. As described above, the wheel rim 2 of the seventh embodiment is formed such that the two second bottom portions 31, 31 face each other in the circumferential direction. Accordingly, in the disc flange portion 105, the two flange protrusion portions 107, 107 are formed in positions where they face each other in the circumferential direction, and the two flange base portions 106, 106 are formed in positions where they face each other in the circumferential direction.

When the wheel disc 103 is fitted into the wheel rim 2, the flange base portions 106, 106 are fitted in the second bottom portions 31, 31, and the flange protrusion portions 107, 107 are fitted inside the first bottom portions 13 between the second bottom portions 31 and 31. Here, the flange protrusion portions 107 facilitate positioning between the wheel disc 103 and the wheel rim 2. Further, the flange base portions 106 and the second bottom portions 31 are joined together by fillet welding, thereby obtaining the automobile wheel 101 of the seventh embodiment 7. In the automobile wheel 101, the flange protrusion portions 107, 107 form no spaces between the disc flange portion 105 and the first bottom portions 13. This allows good appearance on the exterior side and preserves desired design. The flange protrusion portions 107 function as stiffening ribs because of their shape effects, thus improving rigidity and strength of the wheel disc 103. Further, since the flange protrusion portions 107 are fitted inside the first bottom portions 13, their functions as stiffening ribs (shape effects) are synergistically enhanced by each other, and this allows further enhancement of effects of improving rigidity of the wheel disc 103 and the wheel rim 2.

Similarly to the above-described first embodiment, the automobile wheel 101 of the seventh embodiment allows a larger difference in area between the area of a cross section in the radial direction of the tire-internal space P in sections where the second bottom portions 31 are provided and the area of a cross section in the radial direction in sections where the first bottom portions 13 are provided, thus allowing improvement in the effect of reducing cavity resonant noise which occurs in the tire-internal space P.

Eighth Embodiment

Figure 16:
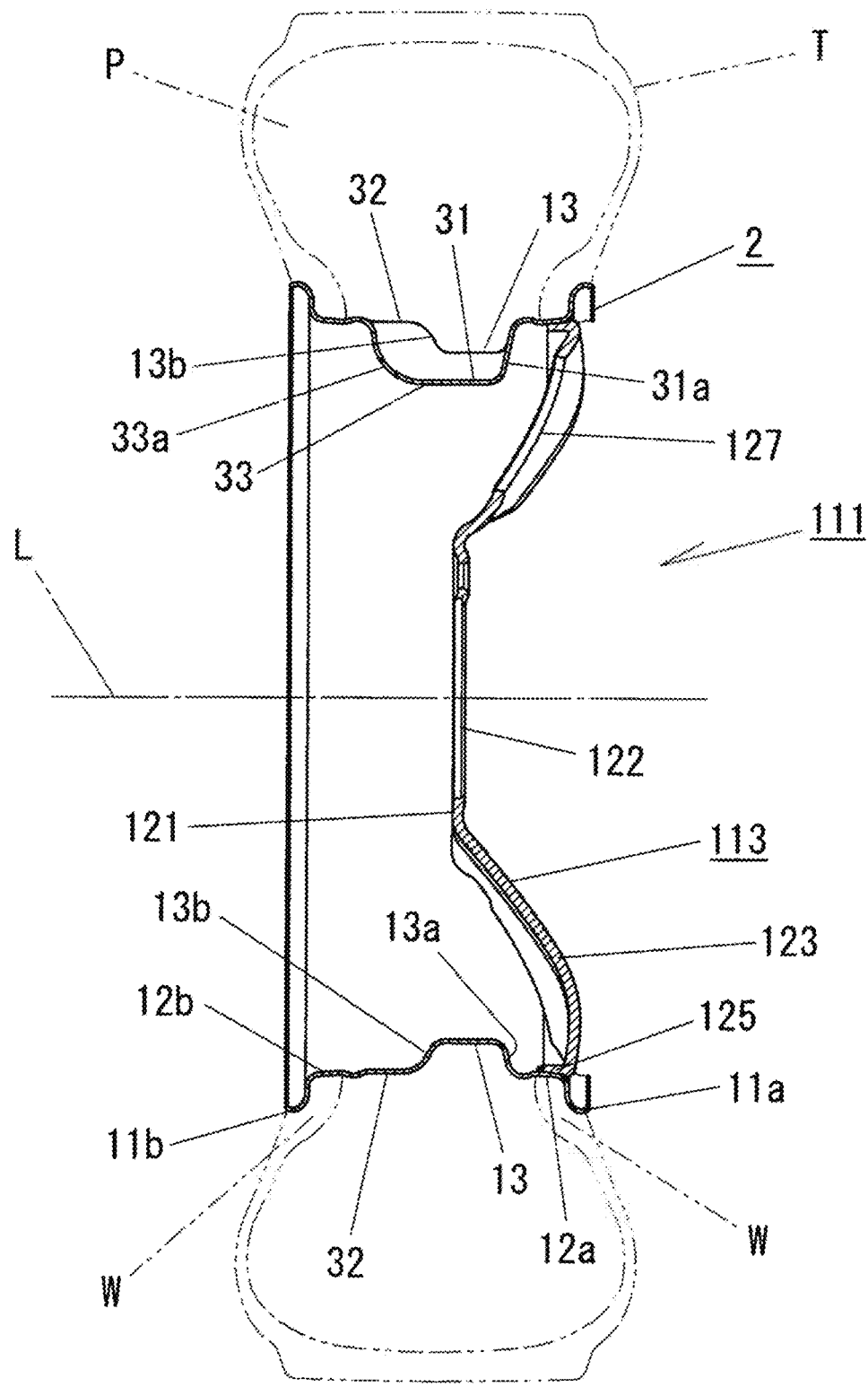
FIG. 16 is a cross-sectional view of an automobile wheel 111 of an eighth embodiment, which corresponds to FIG. 2.

As shown in FIG. 16, an automobile wheel 111 of an eighth embodiment has a so-called bead-fitting type configuration. In other words, a disc flange portion 125 of a wheel disc 113 is fitted in the front side bead seat portion 12a of the wheel rim 2, and the front side bead seat portion 12a and the disc flange portion 125 are welded together.

Here, the wheel rim 2 has the same configuration as the above-described first embodiment. Further, the wheel disc 113 includes a hub mount portion 121 including a hub hole 122, a plurality of spoke portions 123 which radially extend outward in the radial direction from an outer rim of the hub mount portion 121, the ring-shaped disc flange portion 125 which is continuously formed with outer ends of the spoke portions 123, and ornamental holes 127 formed between the spoke portions 123 adjacent to each other.

The automobile wheel 111 of the eighth embodiment has its wheel rim 2 in the same configuration as the first embodiment, thus allowing improvement in the effect of reducing cavity resonant noise similarly to the first embodiment. As described above, the present invention may be applied to the automobile wheel 111 of a bead-fitting type.

Ninth Embodiment

Figure 17:
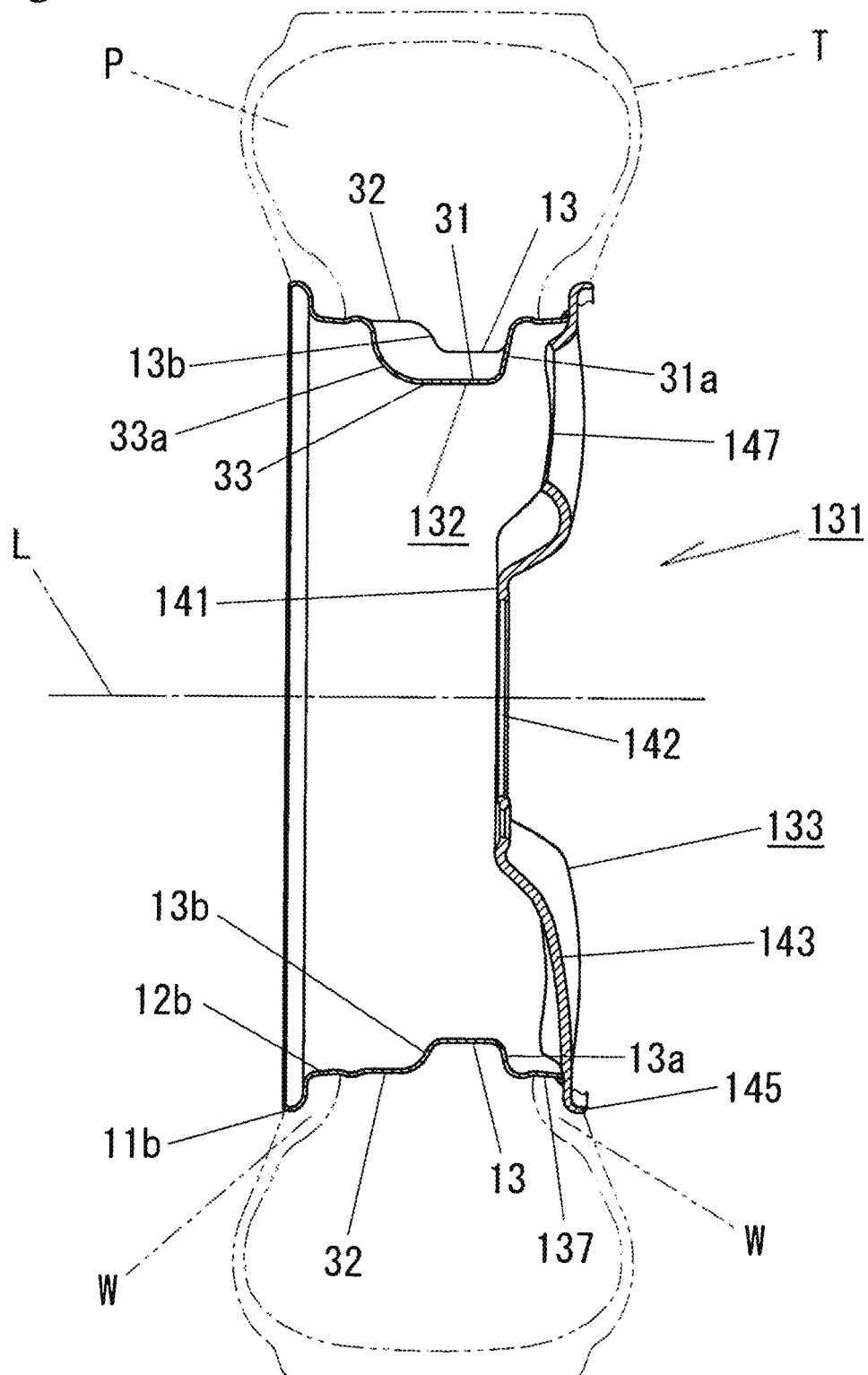
FIG. 17 is a cross-sectional view of an automobile wheel 131 of a ninth embodiment, which corresponds to FIG. 2.

As shown in FIG. 17, an automobile wheel 131 of a ninth embodiment is a so-called full face wheel type. In other words, an open end rim of a front side bead seat portion 137 of a wheel rim 132 is butted against a back surface of an outer rim of a wheel disc 133 and welded.

Here, the wheel rim 132 has the same configuration as the first embodiment except for including no front side rim flange portion, and descriptions of like numerals will be omitted. Further, the wheel disc 133 includes a front side flange portion 145 formed around the outer rim of the wheel disc 133, a hub mount portion 141 including a hub hole 142, a plurality of spoke portions 143 which radially extend from an outer rim of the hub mount portion 141, and ornamental holes 147 between the spoke portions 143 adjacent to each other.

In the automobile wheel 131 of the ninth embodiment, its wheel rim 132 includes the first bottom portions 13, second bottom portions 31, third bottom portions 32, and fourth bottom portions 33 in the same configuration as the first embodiment, thus allowing improvement in the effect of reducing cavity resonant noise similarly to the first embodiment. As described above, the present invention may be applied to the automobile wheel 131 of a full face type.

Meanwhile, as an alternative example of the above-described embodiments, a configuration may be proposed in which the wheel disc 103 of the seventh embodiment is welded to each of the wheel rims of the first to sixth embodiments. An one of those configurations will provide the similar effect to the seventh embodiment. Further, as an alternative example of the above-described embodiments, a configuration may be proposed in which the wheel disc 113 of the eighth embodiment is welded to each of the wheel rims of the second to sixth embodiments. Any one of those configurations will provide the similar effect to the eighth embodiment. Moreover, as an alternative example of the above-described embodiments, a configuration may be proposed in which each of the wheel rims of the second to sixth embodiments in a configuration having no front side rim flange portion is welded to the wheel disc 133 of the ninth embodiment. Any one of those configurations can provide the similar effect to the ninth embodiment.

In the configuration of the seventh embodiment, the flange protrusion portions are fitted inside the first bottom portions between the second bottom portions. However, an alternative configuration may include a flange protrusion portion which is disposed between the second bottom portions and is loosely fitted inside the first bottom portions. In such a case, a space is formed between the first bottom portions and the flange protrusion portion, thus improving the effect of cooling the brake similarly to the first embodiment.

In the configurations of the first to seventh embodiments, the wheel disc and the wheel rim are joined together by welding. However, the present invention is not limited to this. Those may be joined by rivets and/or glue.

In the above-described first to ninth embodiments, the wheel rim and wheel disc that are molded from steel plates are joined together. However, the wheel rim and wheel disc may be molded from aluminum alloy plates. Similarly, those may be molded from plates of alloys such as magnesium alloy and titanium alloy. Further, the wheel rim and the wheel disc may be molded from plates of different kinds of metals.

The present invention is not limited to the above-described embodiments, but configurations other than the embodiments may be appropriately carried out within the scope of the gist of the present invention. For example, first and second bottom portions may respectively be plurally provided such as in three or four.

The invention claimed is:

1. An automobile wheel comprising:
a wheel rim including a front side bead seat portion and a back side bead seat portion for supporting a bead of a tire; and a wheel disc which is coupled to an axle, wherein
the wheel rim further comprises:
a plurality of first bottom portions positioned between the front side bead seat portion and the back side bead seat portion and provided inward in a radial direction with respect to the bead seat portions; and
a plurality of second bottom portions positioned between the front side bead seat portion and the back side bead seat portion and provided inward in the radial direction with respect to the first bottom portions,
the first bottom portions and the second bottom portions are alternately provided in a circumferential direction of the wheel rim,
the wheel rim includes third bottom portions positioned between the front side bead seat portion and the back side bead seat portion and provided adjacently to the first bottom portions in a front-back direction,
the third bottom portions are positioned at a same position or inward in the radial direction with respect to the front side bead seat portion and the back side bead seat portion and are positioned outward in the radial direction with respect to the first bottom portions,
the wheel rim includes fourth bottom portions positioned between the front side bead seat portion and the back side bead seat portion and provided adjacently to the second bottom portions in the front-back direction, and
the fourth bottom portions are positioned inward in the radial direction of the first bottom portions and are positioned at a same position or outward in the radial direction with respect to the second bottom portions.

2. The automobile wheel according to claim 1,
wherein the wheel rim includes the two second bottom portions, and
wherein the second bottom portions are provided in positions where the second bottom portions face each other in the circumferential direction of the wheel rim.

3. The automobile wheel according to claim 1,
wherein the wheel disc includes a disc flange portion which is fitted in the wheel rim, and the disc flange portion is joined with the second bottom portions of the wheel rim.

4. The automobile wheel according to claim 3,
wherein the wheel disc includes a ring-shaped disc flange portion, and
the disc flange portion is fitted in the second bottom portions of the wheel rim.

5. The automobile wheel according to claim 3,
wherein the disc flange portion of the wheel disc includes:
arc-shaped flange base portions which are fitted in the second bottom portions of the wheel rim; and
flange protrusion portions protruding outward in the radial direction of the flange base portions and disposed between the second bottom portions adjacent to each other.

\* \* \* \* \*